June 10, 1958
G. V. MORRIS
SUBSCRIPTION TELEVISION CODE CARD COUPON BOOK
Filed July 28, 1953
2,838,234
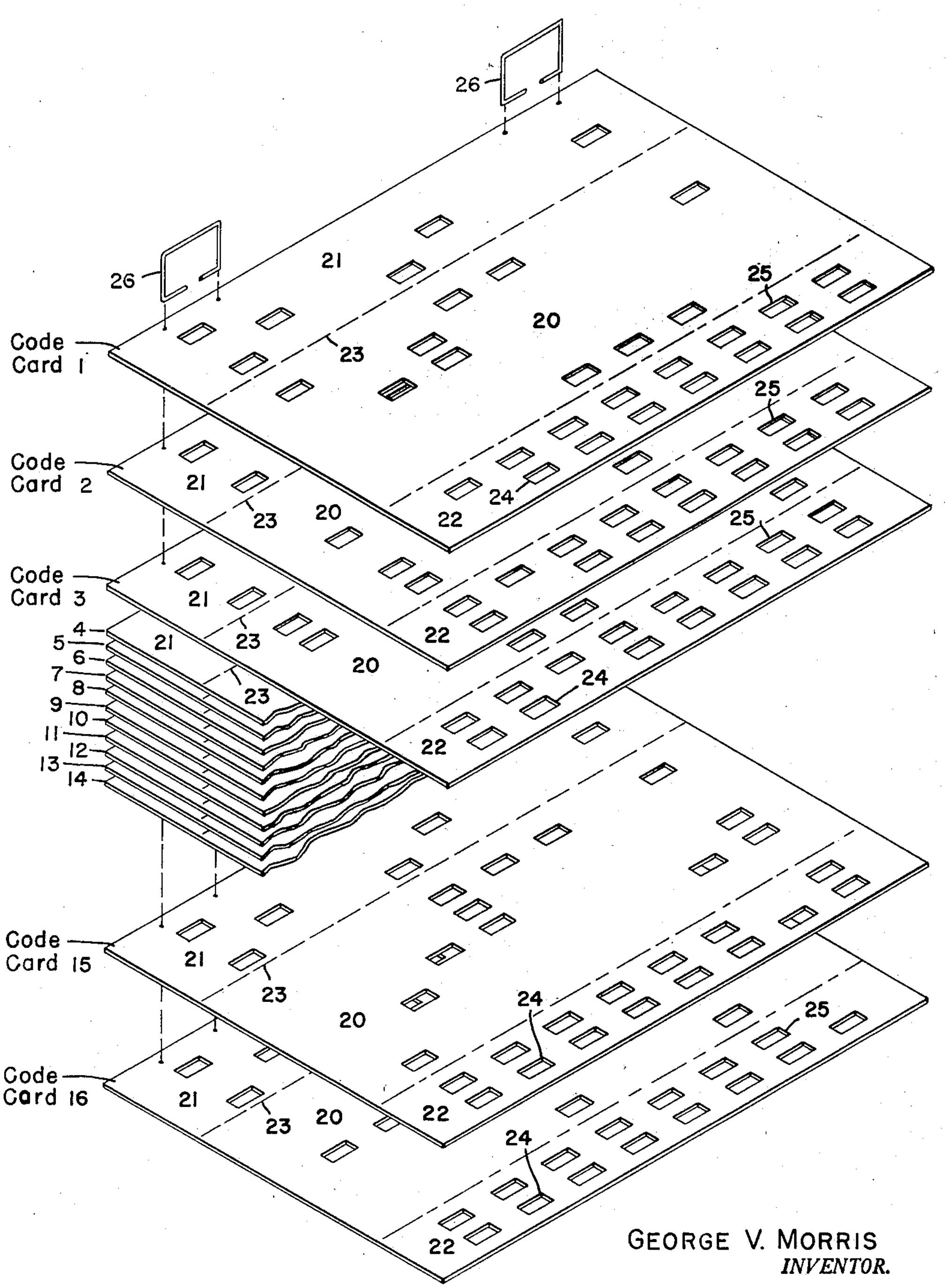
GEORGE V. MORRIS
*INVENTOR.*
BY Francis W. Lorotty
HIS ATTORNEY.

United States Patent Office
2,838,234
Patented June 10, 1958

2,838,234

SUBSCRIPTION TELEVISION CODE CARD COUPON BOOK

George V. Morris, Chicago, Ill., assignor to Zenith Radio Corporation, a corporation of Illinois Application July 28, 1953, Serial No. 370,804
3 Claims. (Cl. 235—61.12)

This invention relates to punch-card coupon books and more particularly to coupon books useful for conveying decoding information in a subscription television system, that is, a system wherein a television signal is transmitted in coded form to be utilized only in subscriber receivers having appropriate decoding apparatus actuated in accordance with the coding schedule employed at the transmitter.

Subscription television systems have been proposed in which a television signal is coded in accordance with a selected coding schedule at the transmitter, and in which a key signal indicating the coding schedule of the telecast is made available to subscriber receivers, being disseminated, for example, over a signal channel such as a closed wire circuit. Mode changes in the television system may be effected by varying the relative timing of the video and synchronizing components of the television signal, and the operating mode is preferably changed at irregular or random intervals. Systems of this general type are disclosed and claimed in Patent 2,510,046, issued May 30, 1950, in the name of Alexander Ellett et al., and in Patent 2,547,598, issued April 3, 1951, in the name of Erwin M. Roschke, both of which are assigned to the present assignee.

The use of a closed wire circuit for distributing the key signal to subscriber receivers is advantageous in that it provides maximum secrecy and facilitates the assessment of subscription fees. Nevertheless, the key signal may be transmitted as a modulation component of the coded television signal itself or it may be sent over any other ether channel. However, if the key signal is transmitted by air in unaltered form, the coding schedule of the telecast may be too easily appropriated by unauthorized persons for decoding purposes. Copending application Serial No. 281,418, filed April 9, 1952, in the name of George V. Morris et al., entitled "Subscription Television System," and assigned to the present assignee, discloses and claims one form of subscription television system in which an air-borne key signal distributed to subscriber receivers conveys coding information in transposed form so that a compensating transposition must be made at the receivers by means of a transposition mechanism, which may compise a series of toggle switches manually adjusted in accordance with a prescribed switch setting pattern, before it may be used for decoding purposes. Such a coded key signal may be distributed as a modulation component of the coded television signal without any great possibility of its being used by unauthorized receivers.

In copending application Serial No. 326,107, filed December 15, 1952, in the name of Jack E. Bridges, entitled "Subscription Television System," and assigned to the present assignee, there is disclosed and claimed another subscription television system featuring an air-borne key signal. In that system a combination of encoding signal components, individually having a predetermined identifying characteristic such as frequency, is transmitted to subscriber receivers along with the composite video signal. These components, which are preferably randomly-sequenced and randomly-appearing within the combination, are derived from the video signal at the receiver and by means of suitable filters are segregated from one another for application over assigned input circuits to a transposition mechanism. The mechanism may employ a family of toggle switches that are manually set in accordance with a predetermined pattern and selectively establishes a multiplicity of circuit conditions between these input circuits and a plurality of output circuits, which are connected to various input circuits of a multistable actuating device such as a bi-stable multivibrator. With this arrangement, the coding signal components may be applied to the actuating device input circuits in a prescribed sequence to operate this device from one to another of its stable operating conditions.

The coding techniques of the described arrangements are very effective and do permit the use of an air-borne code conveying signal while preserving an adequate degree of secrecy. However, it may be desirable to simplify the encoding equipment necessitated particularly at the subscriber receivers without detracting from the secrecy aspects while at the same time minimizing the effort required on the part of the subscriber in setting up or adjusting his decoding apparatus for effecting faithful image reproduction. Consequently, it has been proposed that the multi-switch transposition mechanisms employed in subscription television systems of the air-borne type such as those described in the aforementioned applications be replaced by relatively simple and expedient arrangements of the well known punch-card type wherein a series of input conductors may be selectively connected to a series of output conductors by means of a perforated code card. With such an arrangement, a subscriber merely has to insert into the decoding apparatus a card having appropriate perforations representing the particular coding schedule employed for a given telecast to establish the correct circuitry for effecting proper decoder operation.

Of course, different cards having distinctly different coding schedules recorded thereon would preferably be required for each separate subscription program and since the various electrical circuits utilized at a subscriber receiver in conjunction with the code cards may be interchanged in a number of combinations to individualize each receiver, the identical coding information may be stored on different cards with different perforation patterns. This method of distinguishing each individual subscriber receiver from another has the obvious advantage of preventing a person bent on fraud from copying the perforation layout of a code card distributed to an authorized subscriber and thereby successfully decoding the coded television signal.

For convenience and economy, it may be desired to provide the authorized subscriber, who has paid the required charge, with a book or group of code cards similar to a coupon book that may include enough detachable cards to decode all of the programs for a predetermined period of time such as a week or a month. There will be times, of course, when a subscriber does not actually view all of the programs broadcast and consequently should be treated equitably by receiving a rebate or credit for such programs. This may be achieved by sending the code card book back to a subscription exchange at the end of the period, be it a week, month, etc., and the book may then be examined and a credit given to the subscriber on the basis of the particular cards not detached from the group. In order to minimize the clerical work involved in such a billing or bookkeeping system, the present invention provides a group of code cards each having coding information stored thereon, but in addition each card is also provided with a distinctive family of charging perforations that are aligned in such a way with the perforations of the other cards in the group that the particular programs not viewed by a subscriber may be determined instantly by scanning the charging perforations.

It is, accordingly, an object of the present invention to provide a relatively simple control device for a subscription television system which exhibits a high degree of security.

It is another object of the invention to provide a replaceable control element for a subscription television system which may conveniently be examined for billing purposes to determine the particular subscription programs viewed by a subscriber.

More particularly, an object of the invention is to provide a code card coupon book comprising a group of code-determining cards for use in a subscription television system, the cards being so distinguishable one from the other in the group that the cards not employed in the system may be determined instantly and very economically.

A code card coupon book for use in a subscription television system, in accordance with the invention, comprises a plurality of code-determining cards for use in the system one at a time, each of the cards having coding information stored thereon and representing a code schedule for determining mode changes in the subscription television system in accordance with the schedule. The code cards also have an area bearing a pattern of perforations identifying each card and individualized as to each card in that one portion of the area of any card is imperforate whereas the corresponding portion of the area of each of the remainder of the cards is perforated. Mechanical means is provided for assembling the code-determining cards into a group with corresponding portions of the areas of the cards in stacked alignment so that when any one of the cards is removed from the group a different row of perforations is unblocked through the remaining cards of the group.

The features of this invention which are believed to be new are set forth with particularity in the appended claims. The invention, together with further objects and advantages thereof, may best be understood, however, by reference to the following description in conjunction with the accompanying drawing, in which the single figure illustrates an exploded, perspective view of a control device constructed in accordance with the invention.

The control device comprises a plurality of code-determining cards shown in the drawing as code cards 1–16. Of course, any convenient number of cards may be employed and grouped together but for purposes of illustration and simplicity of explanation only 16 such cards will be considered in the group. Each of the cards has coding information stored thereon in the central area 20 by virtue of a pattern of perforations that are peculiar to a particular coding schedule. Preferably, each one of cards 1–16 has a different pattern in order that each program may be coded in accordance with a different coding schedule. By inserting any one of the cards into a decoding mechanism various circuit conditions may be established, according to the particular pattern of apertures, to effect decoding. For example, the cards may be employed in a scanning system such as is described and claimed in copending application Serial No. 228,307, filed May 25, 1951, now abandoned, in the name of Alexander Ellett, and assigned to the present assignee, to derive a decoding signal. Moreover, the code cards may be adapted in many other ways to represent distinctive coding information; for example, they may be provided with a family of printed circuits that are interposed into the decoding circuits to achieve proper image reproduction as in a system of the type disclosed and claimed in copending application Serial No. 349,076, filed April 15, 1953, in the name of George V. Morris et al., and assigned to the present assignee.

Cards 1–16 also individually have an area or stub portion 21 separated from area or coupon portion 20 and bearing an identical pattern of apertures in order to identify the subscriber. The area 20 of each card is preferably detachable from stub 21 as indicated by perforation lines 23. The cards in the group are assembled by mechanically connecting, as for example by stapling or binding, all of the stub portions 21 together. Such a mechanical connection is illustrated by staples 26. Of course, the group has been shown in the drawing in exploded form for illustrative purposes only. Staples 26 would ordinarily extend through the entire stack of cards and be turned under adjacent the lower surface of card 16. With this coupon book arrangement, the cards may be detached from the book or group and inserted into a decoder as they are required.

There may be times when a subscriber does not actually use all of the code cards and may therefore desire to return his code book to a subscription television exchange and receive a rebate or credit for the programs not viewed. In accordance with the invention, a novel perforation layout is included on each card to facilitate extremely rapid and convenient determination of the cards not used. Specifically, each of cards 1–16 has an area 22 bearing a pattern of perforations identifying each card and individualized as to each card in that one portion of the area of any card is imperforate whereas the corresponding portion of the area of each of the remainder of the cards is perforated. In other words, if one of the cards, for example card 2, is detached from its associated stub and used for decoding purposes, an unblocked aperture through the remaining cards of the group is established by means of perforations 24. Assuming as another example that card 15 is removed from the book, an aperture through perforations 25 is unblocked.

Thus, the charging or billing portion 22 of a book of cards may be scanned in any well-known manner and the particular apertures that are unblocked indicates the specific cards utilized. Conversely, a scanning device may instantly indicate the particular cards not used since the apertures assigned to such cards will be blocked thereby.

The invention provides, therefore, a code card coupon book for use in a subscription television system which is extremely simple in construction and provides a high degree of security and yet which facilitates economical and convenient assessment of subscription charges.

While a particular embodiment of the invention has been shown and described, modifications may be made, and it is intended in the appended claims to cover all such modifications as may fall within the true spirit and scope of the invention.

I claim:

1. A code card coupon book for use in a subscription television system comprising: a plurality of code-determining cards for use in said system one at a time, each of said cards having coding information stored thereon and representing a code schedule for determining mode changes in said subscription television system in accordance with said schedule, said code cards also having an area bearing a pattern of perforations identifying each card and individualized as to each card in that one portion of said area of any card is imperforate whereas the corresponding portion of said area of each of the remainder of said cards is perforated; and mechanical means for assembling said code-determining cards into a group with corresponding portions of said areas of said cards in stacked alignment so that when any one of said cards is removed from the group a different row of perforations is unblocked through the remaining cards of said group.

2. A code card coupon book for use in a subscription television system comprising: a plurality of code-determining cards for use in said system one at a time, each of said cards having coding information stored thereon and representing a code schedule for determining mode changes in said subscription television system in accordance with said schedule, said code cards also having an area bearing a pattern of perforations equal to one less than the number of said cards identifying each card and individualized as to each card in that one portion of said area of any card is imperforate whereas the corresponding portion of said area of each of the remainder of said cards is perforated; and mechanical means for assembling said code-determining cards into a group with corresponding portions of said areas of said cards in stacked alignment so that when any one of said cards is removed from the group a different row of perforations is unblocked through the remaining cards of said group.

3. A code card coupon book for use in a subscription television system comprising: a plurality of code-determining cards for use in said system one at a time, each of said cards having coding information stored thereon and representing a distinct code schedule for determining mode changes in said subscription television system in accordance with said schedule, said code cards also each having one area bearing an identical pattern of perforations identifying a particular subscriber and another area bearing a pattern of perforations identifying each card and individualized as to each card in that one portion of said other area of any card is imperforate whereas the corresponding portion of said other area of each of the remainder of said cards is perforated; and mechanical means for assembling said code-determining cards into a group with corresponding portions of said other areas of said cards in stacked alignment so that when any one of said cards is removed from the group a different row of perforations is unblocked through the remaining cards of said group.

References Cited in the file of this patent

UNITED STATES PATENTS

| | | |
|---|---|---|
| 1,506,382 | Peirce | Aug. 26, 1924 |
| 2,072,447 | Gray | Mar. 2, 1937 |
| 2,357,444 | Armbruster | Sept. 5, 1944 |
| 2,558,577 | Myers | June 26, 1951 |